(12) United States Patent
Huber et al.

(10) Patent No.: US 10,544,338 B2
(45) Date of Patent: Jan. 28, 2020

(54) TAPE ADHESIVE FOR AN INSULATING TAPE IN AN INSULATION SYSTEM AND AN INSULATION SYSTEM

(71) Applicant: Siemens Aktiengesellschaft, Munich (DE)

(72) Inventors: Juergen Huber, Erlangen (DE); Irene Olbrich, Berlin (DE); Dieter Schirm, Breitenguessbach (DE); Matthias Uebler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 157 days.

(21) Appl. No.: 15/560,652

(22) PCT Filed: Mar. 15, 2016

(86) PCT No.: PCT/EP2016/055557
§ 371 (c)(1),
(2) Date: Sep. 22, 2017

(87) PCT Pub. No.: WO2016/150764
PCT Pub. Date: Sep. 29, 2016

(65) Prior Publication Data
US 2018/0094177 A1    Apr. 5, 2018

(30) Foreign Application Priority Data
Mar. 24, 2015 (DE) .................. 10 2015 205 328

(51) Int. Cl.
| | | |
|---|---|---|
| C09J 171/02 | (2006.01) | |
| C08G 65/26 | (2006.01) | |
| H01B 3/04 | (2006.01) | |
| H01B 3/40 | (2006.01) | |
| B32B 19/02 | (2006.01) | |

(52) U.S. Cl.
CPC ............. *C09J 171/02* (2013.01); *B32B 19/02* (2013.01); *C08G 65/2612* (2013.01); *H01B 3/04* (2013.01); *H01B 3/40* (2013.01)

(58) Field of Classification Search
CPC .................................................. C08G 65/2612
See application file for complete search history.

(56) References Cited

U.S. PATENT DOCUMENTS

| | | | | |
|---|---|---|---|---|
| 2,656,290 A | * | 10/1953 | Berberich | H01B 3/04 156/185 |
| 3,556,925 A | | 1/1971 | Mertens | 428/149 |
| 5,158,826 A | * | 10/1992 | Ihlein | C08G 59/24 428/324 |
| 6,140,590 A | | 10/2000 | Baumann et al. | 174/137 B |
| 6,774,250 B1 | | 8/2004 | Hatton et al. | 549/546 |
| 2013/0147307 A1 | * | 6/2013 | Morooka | H02K 3/40 310/215 |

FOREIGN PATENT DOCUMENTS

| | | | |
|---|---|---|---|
| RU | 2189099 C2 | 9/2002 | ............ H01B 3/04 |
| RU | 2332736 C1 | 8/2008 | ............ H01B 3/04 |
| WO | 2016/050450 A1 | 4/1916 | ............ H01B 3/40 |
| WO | 2016/150764 A1 | 9/1916 | ........... B32B 19/00 |
| WO | 90/00802 A1 | 1/1990 | ........... C07D 233/61 |

OTHER PUBLICATIONS

Russian Office Action, Application No. 2017132974/05, 13 pages, dated Jul. 13, 2018.
International Search Report and Written Opinion, Application No. PCT/EP2016/055557, 17 pages, dated May 24, 2016.

* cited by examiner

*Primary Examiner* — Alexandre F Ferre
(74) *Attorney, Agent, or Firm* — Slayden Grubert Beard PLLC

(57) ABSTRACT

Tape adhesives suitable for impregnating processes for insulation systems are described. Embodiments of the tape adhesives include solid insulation material such as mica, anhydride-free impregnating resins and accelerators for the anhydride-free impregnating resins. The tape adhesives may be adjusted with respect to the reactivity of the accelerators for the anhydride-free impregnating resins in relation for the storage stability of the overall insulation systems.

10 Claims, No Drawings

TAPE ADHESIVE FOR AN INSULATING TAPE IN AN INSULATION SYSTEM AND AN INSULATION SYSTEM

CROSS-REFERENCE TO RELATED APPLICATIONS

This application is a U.S. National Stage Application of International Application No. PCT/EP2016/055557 filed Mar. 15, 2016, which designates the United States of America, and claims priority to DE Application No. 10 2015 205 328.8 filed Mar. 24, 2015, the contents of which are hereby incorporated by reference in their entirety.

FIELD OF THE INVENTION

The invention relates to a tape adhesive for an insulating tape in an insulation system and to an insulation system, especially an insulation system for electrical machines in the high-voltage sector from 1 kV upward, comprising an anhydride-free impregnating resin, for example an impregnating resin having oxirane functionalities.

BACKGROUND OF THE INVENTION

Electrical machines contain in the multitude of longitudinal grooves in the laminated stator core, special kinds of coil windings. These coils are generally made of copper, which produce a magnetic field that propagates in all directions by virtue of time-selective applications of current. This field in turn drives the freely rotating rotor suspended in the stator bore, the rotor being able to react to the induced magnetic field in the form of forced rotation, for example, by virtue of a multitude of applied permanent magnets. Thus, electrical energy can be converted to kinetic energy. The laminated stator core is at ground potential, and the coils by contrast at a high kilovolt potential. The coils in the stator grooves must accordingly be electrically insulated with respect to ground.

For this purpose, each and every coil is insulated with a special mica paper-based tape ("mica tape") multiple times with a defined overlap. Mica is used since it is an inorganic solid insulation material in platelet form that is capable of retarding electrical erosion under electrical partial discharge scenarios for a long periods, and has good chemical and thermal stability. Mica tapes consist, for example, of mica paper and one or more carriers (e.g., foil) joined to one another via a tape adhesive. Mica tapes are used with preference over mica paper, since mica paper alone does not have the mechanical strength necessary for an insulation process.

Accordingly, further additives may be added to the tape adhesive. For example, accelerators may be added that have a catalytic effect on the thermal curing of an impregnating agent subsequently applied externally after the coils insulated with mica tape have been fitted into the laminated stator cores and electrically connected. For avoidance of partial discharges during later operation, the air in the voids of the windings and especially in the groove gaps of the laminated stator core is displaced by the impregnating agent. Since this distance from insulated coil to which current is applied to the laminated core is generally kept as small as possible, field strengths of several kV/mm are by no means rare at that point. The insulation material has to be chosen accordingly.

Thermally curable epoxy resin/anhydride mixtures have been found to be reliable for these purposes. In the "VPI method" known to those skilled in the art as vacuum pressure impregnation, the stators from the electrical machines, composed of their individual parts, together with the fitted and mica tape-insulated coils, are wholly flooded according to the prior art with a mobile epoxy resin/phthalic anhydride formulation in a vacuum chamber and then impregnated under pressure. Depending on the interplay between the accelerator in the mica tape and impregnating agent, there may be gelation of the impregnating agent that has penetrated into the mica tape insulation even during the impregnation phase.

Since phthalic anhydrides, however, are respiratory system-sensitizing substances, there is great interest in the production of entirely anhydride-free insulation systems, such as impregnating resins with oxirane functionalities, which are known, for example, from DE 102014219844.5.

The final curing is generally effected under standard pressure in an industrial kiln. The accelerator in the mica tape (tape accelerator) here has the task of gelation and curing the impregnating resin applied, which has to date always been epoxy resin with phthalic anhydride, within a desired period of time at a defined temperature. The impregnating agent which has become established as the industrial standard is a mixture of distilled bisphenol A diglycidyl ether and methylhexahydro-phthalic anhydride; this very mobile formulation which, in the absence of accelerator substances, has a desirably long storage stability at impregnation temperature (for example doubling of the initial viscosity only after several weeks), but reacts rapidly to give the high polymer in the presence of catalytically active species. Since the mica tape, however, likewise has to have storage stability for a sufficiently long period, the tape adhesive and tape accelerator should be inert with respect to one another. Ideally, all three components (tape adhesive, tape accelerator and impregnating agent) only react with one another at the moment of encounter during the VPI process. This achieves the best possible crosslinking and binding, compatibility and ultimately freedom from faults and cavities and hence long electrical lifetimes of the "main insulation" of the electrical machine that is the ultimate result of the curing.

Since the impregnating agent ("impregnating resin") has to date always still been an epoxy resin/phthalic anhydride mixture, an amine derivative is often the method of choice for initiation of curing. For instance, the tape accelerator is frequently a substituted amine, for example based on a piperazine or the like, because it is possible by virtue of this species to establish comparatively high glass transition temperatures in epoxy resin/anhydride mixtures on thermal curing. In addition, zinc naphthenate is an established tape accelerator.

Since the tape adhesive is ideally likewise oxirane-functional for optimal compatibility or reaction with the impregnating resin, a problem that arises is that of storage stability in the mica tape. Especially when using anhydride-free impregnating resins, accelerators that initiate anionic and/or cationic polymerization mechanisms are used, and are therefore found to be less inert with respect to the conventional tape adhesives than with respect to an accelerator for an acid anhydride/reactive resin mixture.

SUMMARY OF THE INVENTION

Correspondingly, it is an object of the present invention to find a tape adhesive for an anhydride-free impregnating resin with a correspondingly reactive accelerator which otherwise fulfills a similar profile of requirements to the tape adhesives used to date in insulation systems with acid anhydride-containing impregnating agents.

According to some embodiments, the present invention provides a tape adhesive for an insulation system, the tape adhesive having a dynamic viscosity of 1-100 Pa*s at impregnation temperature, which may comprise an addition product formed from a bisphenol, diol, triol and/or higher alcohol, referred to hereinafter as an "$A(OH)_n$" segment, with cyclohexene oxide or a cyclohexene oxide derivative, referred to hereinafter as a "Cy" segment. Embodiments of the invention may also provide an insulation system comprising a solid insulation material, an anhydride-free impregnating resin, an accelerator and a tape adhesive.

According to preferred embodiments, the present invention for the first time provides a tape adhesive suitable for impregnating processes for an insulation system, comprising solid insulation material such as mica, an anhydride-free impregnating resin and an accelerator for the anhydride-free impregnating resin, wherein the tape adhesive is adjusted with respect to the reactivity of an accelerator or curing catalyst of an anhydride-free impregnating resin in relation to the storage stability of the overall system.

According to a preferred embodiment, the present invention is directed to an insulation system that may comprise a solid insulation material, an anhydride-free impregnating resin, an accelerator, and an oxirane group free tape adhesive having a viscosity of about 5 to about 20 Pa*s at about 70° C.

According to another preferred embodiment, the present invention is directed to an insulation system comprising a solid insulation material, an anhydride-free impregnating resin, an accelerator, and a tape adhesive, wherein the tape adhesive comprises an addition product formed from an $A(OH)_n$ segment comprising bisphenols, diols, triols and/or higher alcohols, with a Cy segment comprising a cyclohexene oxide, a cyclohexene oxide derivative, or mixtures of a cyclohexene oxide and a cyclohexene oxide derivative. Preferably, the tape adhesive has a dynamic viscosity of 1-100 Pa*s at impregnation temperature.

DETAILED DESCRIPTION OF THE PREFERRED EMBODIMENTS OF THE INVENTION

In an advantageous embodiment, suitable tape adhesives are compounds which react by a chemical oxirane-hydroxyl reaction with creation of new hydroxyl groups in vicinal positions from cyclohexene oxide and/or monoepoxidic cyclohexene oxide derivatives and diols, triols and/or higher alcohols, alcohol derivatives, esters of aliphatic, cycloaliphatic and/or aromatic nature, and aromatic and cycloaliphatic bisphenols $A(OH)_n$ (where A corresponds to the empirical formula radical depleted in a formal sense of n OH groups according to the Lewis empirical formula nomenclature) with n=2 to 20, and after vacuum- and temperature-mediated distillative removal of unreacted cyclohexene oxide or cyclohexene oxide derivative have a viscosity of 1-100 Pa·s at impregnation temperature.

Suitable examples of $A(OH)_n$ are:

monoethylene glycol ($C_2H_4$) $(OH)_2$, butanediols ($C_4H_8$) $(OH)_2$, butenediols ($C_4H_6$) $(OH)_2$, butynediol ($C_4H_4$) $(OH)_2$, polyethylene glycols $H(OC_2H_4)_x$ $(OH)_2$ with x=1 to 5000, propylene glycol ($C_3H_6$) $(OH)_2$, polypropylene glycols $H(OC_3H_6)_x$ $(OH)_2$ with x=1 to 5000, diethylene glycol ($C_2H_8O$) $(OH)_2$, propanediols ($C_3H_6$) $(OH)_2$, neopentyl glycol ($C_5H_{10}$) $(OH)_2$, cyclopentanediols ($C_5H_8$) $(OH)_2$, cyclopentenediols ($C_5H_6$) $(OH)_2$, glycerol ($C_3H_5$) $(OH)_3$, pentanediols ($C_5H_{10}$) $(OH)_2$, pentaerythritol ($C_5H_8$) $(OH)_4$, hexanediols ($C_6H_{12}$) $(OH)_2$, hexylene glycols ($C_6H_{12}$) $(OH)_2$, heptanediols ($C_7H_{14}$) $(OH)_2$, octanediols ($C_8H_{16}$) $(OH)_2$, polycaprolactonediols, polycaprolactonetriols, hydroquinone ($C_6H_4$) $(OH)_2$, resorcinol ($C_6H_4$) $(OH)_2$, (pyro)catechol ($C_6H_4$) $(OH)_2$, rucinol ($C_{10}H_{12}$) $(OH)_2$, triethylene glycol ($C_6H_{12}$) $(OH)_2$, fully aromatic, partly hydrogenated and/or fully hydrogenated bisphenol A ($C_{15}H_{14}$) $(OH)_2$, ($C_{15}H_{28}$) $(OH)_2$, bisphenol F ($C_{13}H_{10}$) $(OH)_2$, bisphenol S ($C_{12}H_8O_2S$) $(OH)_2$, tricyclodecanedimethanol ($C_{12}H_{18}$) $(OH)_2$, glycerol carbonate ($C_4H_5$) $(OH)_1$.

In a preferred embodiment, the tape adhesive has a viscosity of 5-20 Pa*s at about 70° C.

According to some embodiments, compounds suitable as tape adhesives are react with anionically and/or cationically curing accelerator substances for conventional 1,2-diepoxides, especially of bisphenol A diglycidyl ether and/or bisphenol F diglycidyl ether having repeat units n≥0. According to preferred embodiments, the tape adhesive of the present invention is free of oxirane groups. According to further embodiments, accelerators with relatively high vacuum stability that initiate anionic polymerization, for example tri-N-methylpiperazine derivative of TMPT, give the required storage stability of the mica insulation tape with tape adhesives that are free of oxirane groups.

According to some embodiments of the invention, cyclohexene oxide and/or a cyclohexene oxide derivatized on the aliphatic cycle only have one oxirane group each, the reaction of these epoxy groups with the hydroxyl groups of the $A(OH)_n$ segment does not give any cycloaliphatic oxirane groups capable of reaction at a later stage, which can react with anionic and/or cationically mediating accelerator substances in the insulation tape.

According to some embodiments, he synthesis of the tape adhesive substances of the invention is possible, for example, by reaction of the particular $A(OH)_n$ reactant with cyclohexene oxide and/or a cyclohexene oxide derivative.

According to some embodiments of the invention, since the reaction of oxiranes and hydroxyls, in terms of chemical mechanism, generates new hydroxyl groups in the target molecule during the oxirane/hydroxyl group reaction, these novel tape adhesive derivatives are additionally also capable of being polymerized into ionically curing, especially phthalic anhydride-free formulations.

Accordingly, the novel tape adhesives of the present invention are likewise also suitable as carriers or encapsulations for ionically active accelerator types, for instance hexafluoroantimonates, tetrafluoroborates and hexafluorophosphates and/or sulfonium derivatives as representatives of what are called superacids or superacid salts, but also for more vacuum-stable alkylmethyl-imidazoles, especially 1-decyl-2-methylimidazole.

According to some embodiments, these show only marginal catalysis, if any, of the bimolecular hydroxyl etherification reaction with compounds containing hydroxyl groups even at elevated temperature around 70° C.

For illustration of the target structures, a few working examples of the tape adhesive compounds usable individually or as a mixture are shown hereinafter in the form of structural formulae:

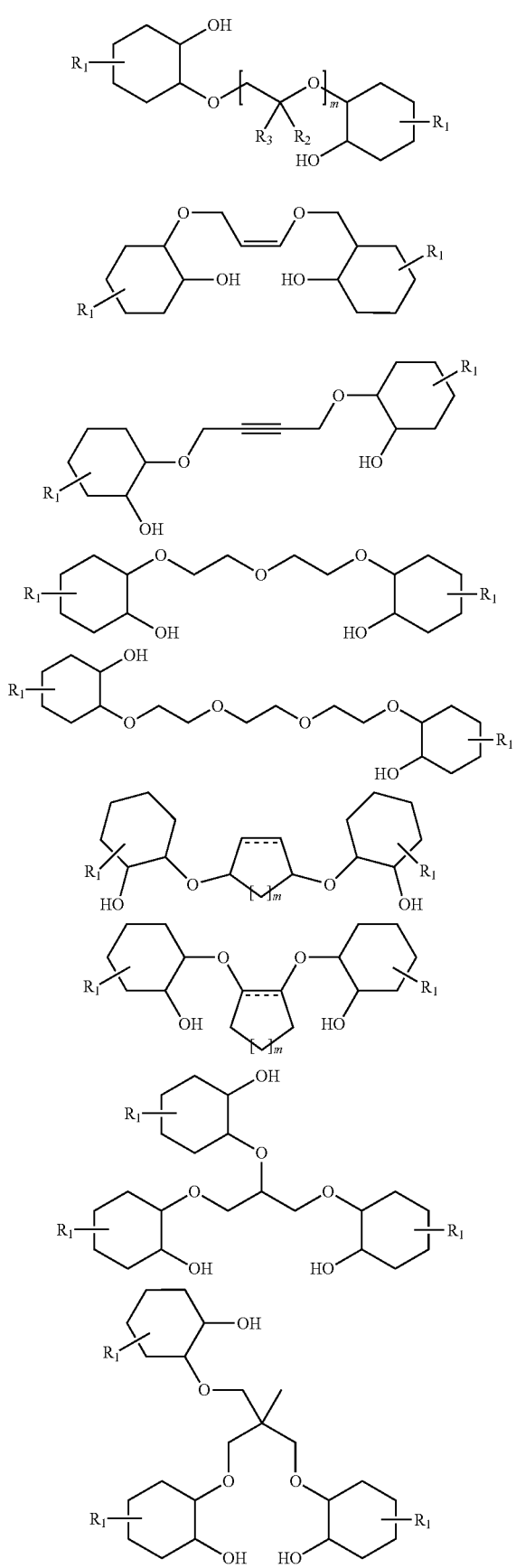
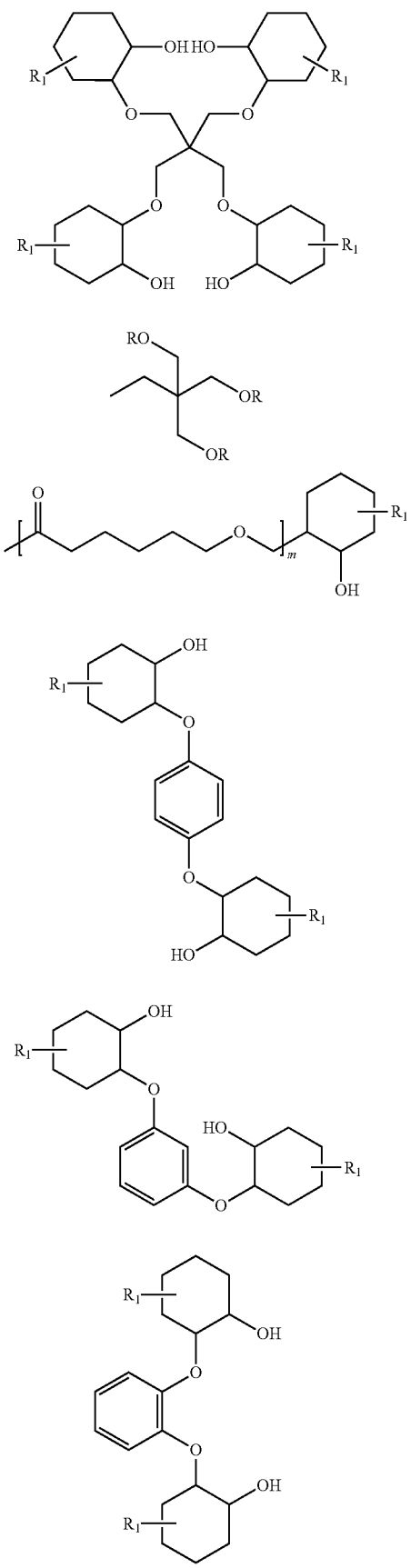

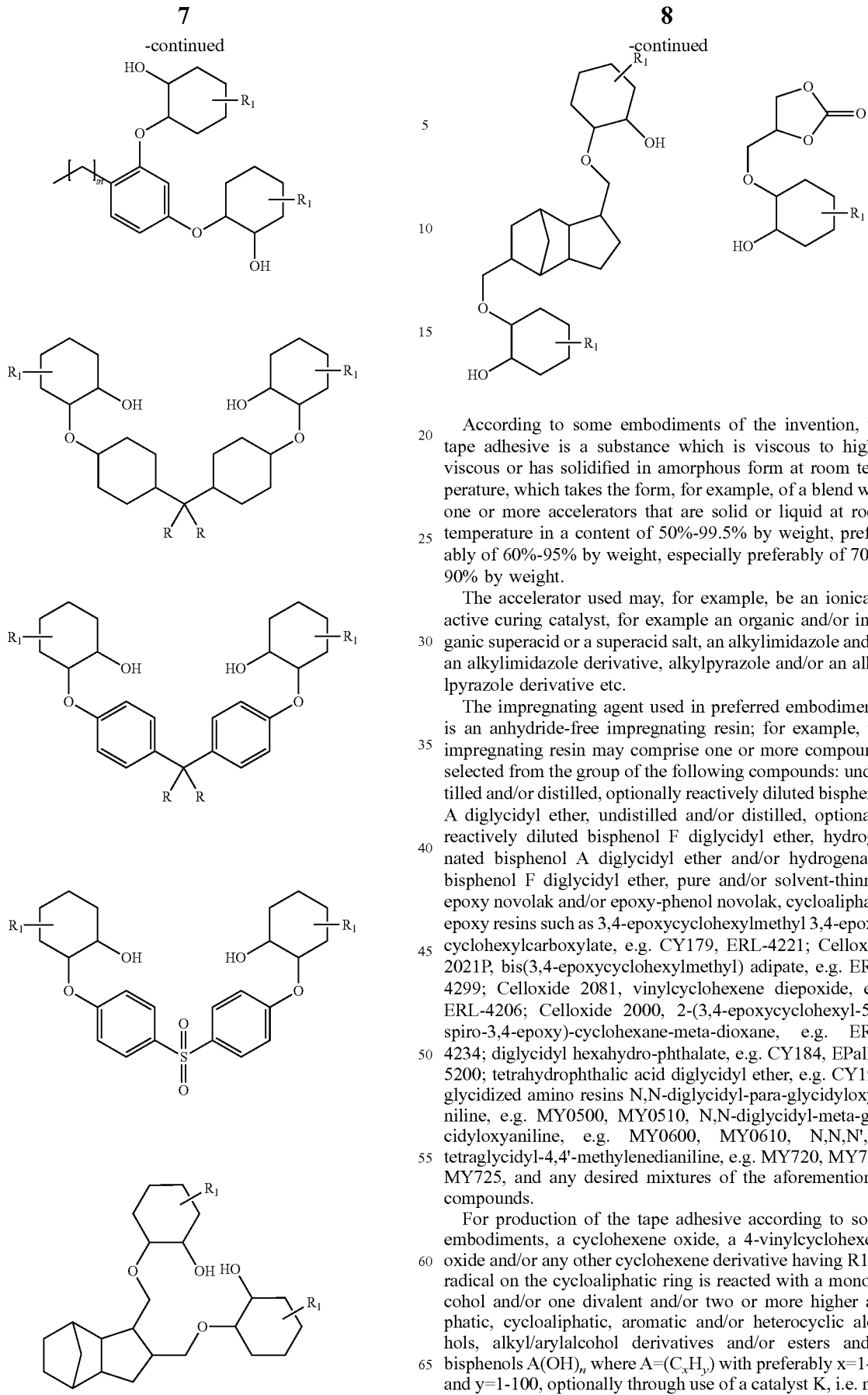

According to some embodiments of the invention, the tape adhesive is a substance which is viscous to highly viscous or has solidified in amorphous form at room temperature, which takes the form, for example, of a blend with one or more accelerators that are solid or liquid at room temperature in a content of 50%-99.5% by weight, preferably of 60%-95% by weight, especially preferably of 70%-90% by weight.

The accelerator used may, for example, be an ionically active curing catalyst, for example an organic and/or inorganic superacid or a superacid salt, an alkylimidazole and/or an alkylimidazole derivative, alkylpyrazole and/or an alkylpyrazole derivative etc.

The impregnating agent used in preferred embodiments, is an anhydride-free impregnating resin; for example, the impregnating resin may comprise one or more compounds selected from the group of the following compounds: undistilled and/or distilled, optionally reactively diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or solvent-thinned epoxy novolak and/or epoxy-phenol novolak, cycloaliphatic epoxy resins such as 3,4-epoxycyclohexylmethyl 3,4-epoxy-cyclohexylcarboxylate, e.g. CY179, ERL-4221; Celloxide 2021P, bis(3,4-epoxycyclohexylmethyl) adipate, e.g. ERL-4299; Celloxide 2081, vinylcyclohexene diepoxide, e.g. ERL-4206; Celloxide 2000, 2-(3,4-epoxycyclohexyl-5,5-spiro-3,4-epoxy)-cyclohexane-meta-dioxane, e.g. ERL-4234; diglycidyl hexahydro-phthalate, e.g. CY184, EPalloy 5200; tetrahydrophthalic acid diglycidyl ether, e.g. CY192; glycidized amino resins N,N-diglycidyl-para-glycidyloxyaniline, e.g. MY0500, MY0510, N,N-diglycidyl-meta-glycidyloxyaniline, e.g. MY0600, MY0610, N,N,N',N'-tetraglycidyl-4,4'-methylenedianiline, e.g. MY720, MY721, MY725, and any desired mixtures of the aforementioned compounds.

For production of the tape adhesive according to some embodiments, a cyclohexene oxide, a 4-vinylcyclohexene oxide and/or any other cyclohexene derivative having R1R1 radical on the cycloaliphatic ring is reacted with a monoalcohol and/or one divalent and/or two or more higher aliphatic, cycloaliphatic, aromatic and/or heterocyclic alcohols, alkyl/arylalcohol derivatives and/or esters and/or bisphenols $A(OH)_n$ where $A=(C_xH_y)$ with preferably $x=1-30$ and $y=1-100$, optionally through use of a catalyst K, i.e. n in the range from about 1 to about 5000, preferably about 2-10.

According to preferred embodiments, the present invention for the first time provides a tape adhesive suitable for conventional impregnating processes for an insulation system, comprising solid insulation material such as mica, an anhydride-free impregnating resin and an accelerator for the anhydride-free impregnating resin, wherein the tape adhesive is adjusted with respect to the reactivity of an accelerator or curing catalyst of an anhydride-free impregnating resin in relation to the storage stability of the overall system.

What is claimed is:

1. An insulation system comprising
a solid insulation material,
an anhydride-free impregnating resin,
an accelerator, and
an oxirane group free tape adhesive having a viscosity of about 5 to about 20 Pa*s at about 70° C., wherein the tape adhesive comprises an addition product formed from an $A(OH)_n$ segment comprising bisphenols, diols, triols, and/or higher alcohols, with a Cy segment comprising at least one compound selected from the group consisting of a cyclohexene oxide and a cyclohexene oxide derivative.

2. The system of claim 1, wherein the accelerator comprises a tri-N-methylpiperazine derivative of trimethylolpropane trimethacrylate.

3. The system of claim 1, wherein the tape adhesive is present together with the accelerator in a blend, wherein the blend comprises from about 50% to about 99.5% tape adhesive by weight.

4. The system of claim 1, wherein the tape adhesive is present together with the accelerator in a blend, wherein the blend comprises from about 60% to about 95% tape adhesive by weight.

5. The system of claim 1, wherein the tape adhesive is present together with the accelerator in a blend, wherein the blend comprises from about 70% to about 90% tape adhesive by weight.

6. The system of claim 1, wherein the solid insulation material comprises mica.

7. An insulation system comprising
a solid insulation material comprising mica,
an anhydride-free impregnating resin,
an accelerator comprising a tri-N-methylpiperazine derivative of trimethylolpropane trimethacrylate, and
an oxirane group free tape adhesive having a viscosity of about 5 to about 20 Pa*s at about 70° C., wherein the tape adhesive comprises an addition product formed from an $A(OH)_n$ segment comprising bisphenols, diols, triols, and/or higher alcohols, with a Cy segment comprising at least one compound selected from the group consisting of a cyclohexene oxide and a cyclohexene oxide derivative.

8. The system of claim 7, wherein the tape adhesive is present together with the accelerator in a blend, wherein the blend comprises from about 50% to about 99.5% tape adhesive by weight.

9. The system of claim 7, wherein the tape adhesive is present together with the accelerator in a blend, wherein the blend comprises from about 60% to about 95% tape adhesive by weight.

10. The system of claim 7, wherein the tape adhesive is present together with the accelerator in a blend, wherein the blend comprises from about 70% to about 90% tape adhesive by weight.

* * * * *